(No Model.)

H. M. RICHARDSON.
CHILD'S CARRIAGE.

No. 243,973. Patented July 5, 1881.

Witnesses.
L. F. Connor.
W. H. Sigston.

Inventor.
Henry M. Richardson
by Crosby & Gregory
Attys

UNITED STATES PATENT OFFICE.

HENRY M. RICHARDSON, OF BOSTON, MASSACHUSETTS, ASSIGNOR TO HIMSELF AND GEORGE McKEE, OF SAME PLACE.

CHILD'S CARRIAGE.

SPECIFICATION forming part of Letters Patent No. 243,973, dated July 5, 1881.

Application filed May 16, 1881. (No model.)

*To all whom it may concern:*

Be it known that I, HENRY M. RICHARDSON, of Boston, county of Suffolk, State of Massachusetts, have invented an Improvement in Children's Carriages, of which the following description, in connection with the accompanying drawings, is a specification.

This invention in children's carriages relates to improvements in the handle and means for connecting it firmly with the carriage-axle to secure great strength and durability.

In this invention each side piece of the handle, bent as shown, and extended from axle to axle, to thus serve the purpose of the usual reach, has a curved stiff metallic brace applied to the bend formed in it at the rear of the carriage-body and rear axle. This metal brace is provided with a projection to extend down at the side of the axle, and preferably with an ear, to be secured by a rivet or bolt to the axle at one side of the handle.

Figure 1:
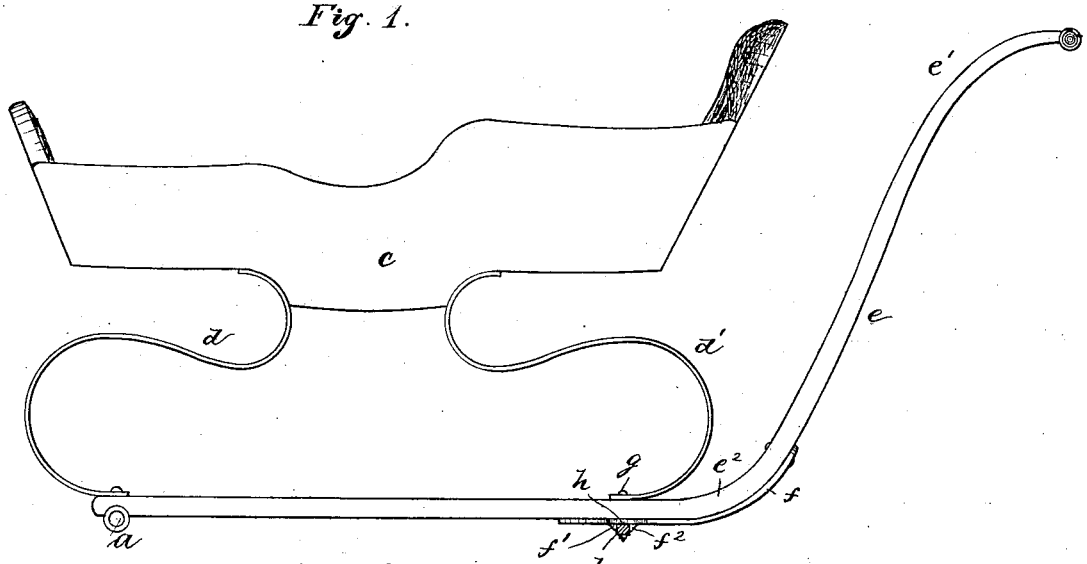
Figure 2:
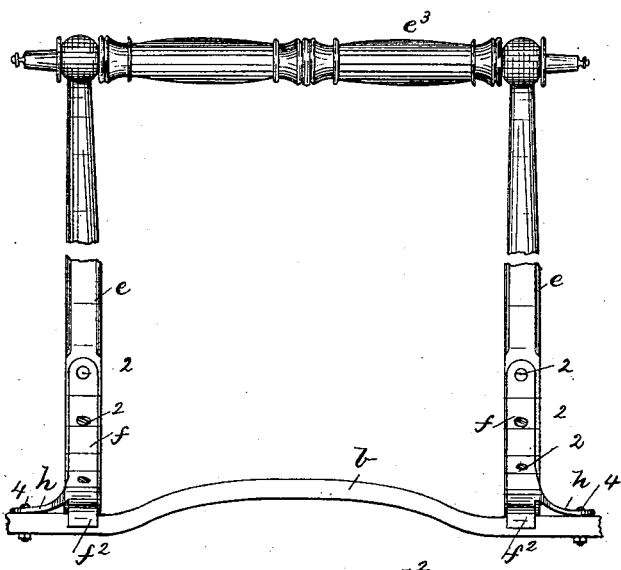
Figure 3:
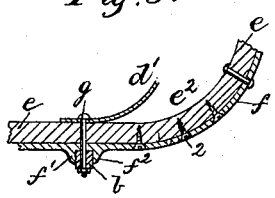
Figure 4:
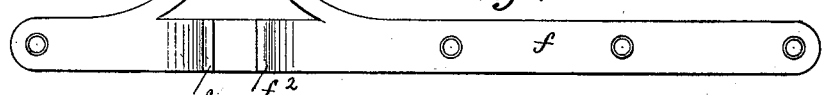

Figure 1 represents, in side elevation, a sufficient portion of a child's carriage to illustrate my invention; Fig. 2, a rear side elevation of the handle and back axle. Fig. 3 is a sectional detail, and Fig. 4 an enlarged detail, of the under side of the metal brace detached.

In the drawings, $a$ represents the front, and $b$ the rear, axle of a child's carriage, having a body, $c$, supported on springs $d$ $d'$.

The handle is composed of two wooden bars, $e$, bent at $e'$ $e^2$, and preferably of sufficient length to extend to the front axle, $a$, thus serving the purposes of the usual reach. The upper ends of the bars are connected by the round or hand piece $e^3$. To keep the bent part $e^2$ in place and secure the handle firmly to the axles in a cheap and simple, yet firm and durable, manner, each bar has applied to it by screws 2, or bolts or rivets, the brace-iron $f$, preferably malleable iron, having the projections $f'$ $f^2$, to embrace the small iron axle $b$, a single bolt, $g$, serving to hold the end of spring $d$, the bar $e$, and brace and axle together, as in Fig. 3.

To afford yet greater security and strength, each brace-iron is provided with an ear or extension, $h$, having a hole, $h^2$, for the reception of a bolt, 4, (see Fig. 2,) by which to secure the said ear to the upper side of the axle $b$.

The ear might be dispensed with, although it is preferable to employ it, as the projections $f'$ $f^2$ at the sides of the axle make a very positive connection between the handle and axle.

I claim—

1. In a child's carriage, the bent handle $e$ and brace-iron, provided with one or more projections to fit the sides of the axle, combined with the axle, substantially as described.

2. The bent handle and brace $f$, provided with a projection, $f'$ or $f^2$, and with the ear $h$, combined with and secured to the axle $b$, all substantially as described.

In testimony whereof I have signed my name to this specification in the presence of two subscribing witnesses.

HENRY M. RICHARDSON.

Witnesses:
   JOS. P. LIVERMORE,
   L. F. CONNOR.